June 28, 1927.
R. PRESTON
1,633,953
MILK APPLIANCE FOR USE WITH MILKING MACHINES
Filed March 7, 1921
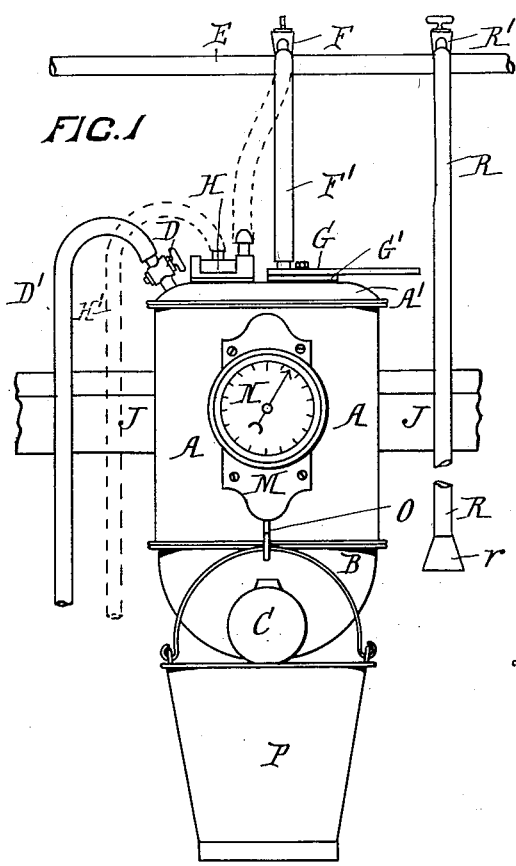
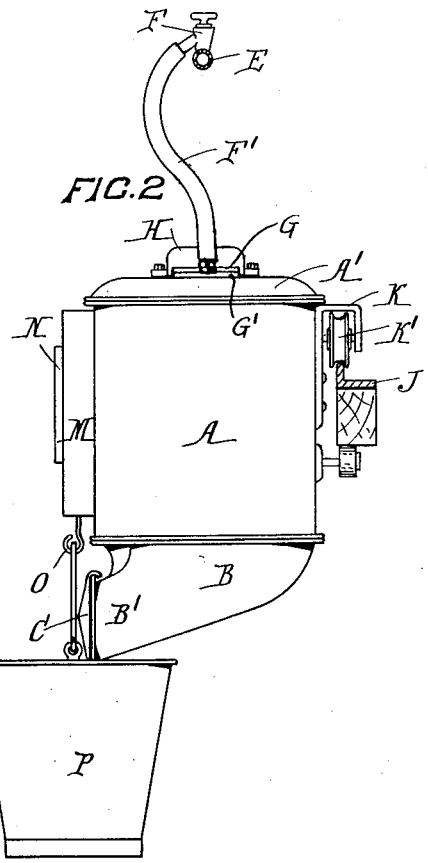
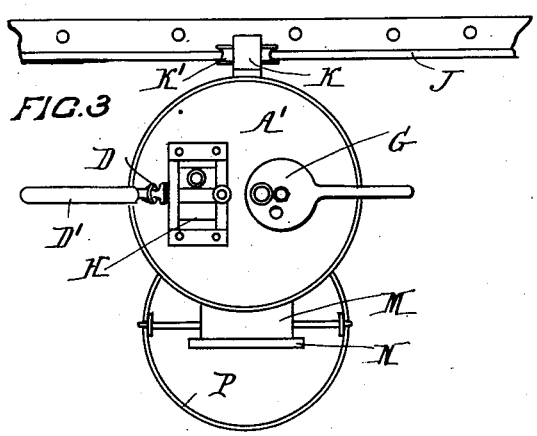

Patented June 28, 1927.

1,633,953

UNITED STATES PATENT OFFICE.

ROBERT PRESTON, OF MANGAPAPA, GISBORNE, NEW ZEALAND.

MILK APPLIANCE FOR USE WITH MILKING MACHINES.

Application filed March 7, 1921, Serial No. 450,297, and in New Zealand May 20, 1920.

This invention has been devised with the object of providing improved means whereby the quantity of the milk given by individual cows, when milked by machinery, may be ascertained, and facility provided for a sample being removed for qualitative testing purposes.

The use of the invention therefore will allow for the quantity and quality of the milk given by each cow of a herd, at each milking, being ascertained and recorded so that the value of the cow from the milk producing aspect may be determined and compared with standards.

The apparatus devised has been designed for use at will, with either machinery working on the single bucket system, in which each cow's milk is drawn into a separate container, or for use with machinery working on the releaser system in which the milk from the several milking points is collected into a main milk-vacuum main and delivered through special appliances into a common receptacle.

The appliances forming the invention are illustrated in the accompanying drawings and will be hereinafter fully described in relation thereto.

In the drawings:—

Figure 1 is a front elevation of the complete machine.

Figure 2 is a side elevation, and,

Figure 3 a plan thereof.

According hereto a receiving can A is provided such can being made of the necessary capacity and constructed to provide for its interior being made airtight. It is provided with a top cover A' and with a bottom fitting B formed with a discharge chute B' leading outward to the front and the mouth of which is covered by a swinging flap valve C so hinged and weighted as to normally close the said mouth. It is also so constructed as to make airtight connection with its seat so that when the can is in vacuum in the working of the apparatus, the air pressure on the outside of the flap will force the flap hard down on to its seat and seal it.

The can top A' is provided with a tap connection D to which the usual milking branch pipe D' is connected so that when the can is in vacuum the milking operation will proceed and the milk be led into the can in the well known manner.

When the can is to be used in a releaser system of milking, the can is connected with the usual overhead milk-vacuum main E through a tap F and flexible pipe F' leading to a special valve apparatus on the can cover constructed to provide for the connection being broken and re-made by manual operation, and for the admission of air to the can when the connection is broken. Such apparatus consists in a valve plate G pivoted to turn upon a flat plate G' fixed on the cover, and having a single port opening through it into the can. The valve plate G is formed with two ports arranged in a line circumferentially coincident with the port in the fixed plate so that either of these two ports may be brought over the single port, at will. One of the valve plate ports is provided with a ferrule attachment g to which the tube connection F' is led, while the other port is left open. Thus by the manipulation of the valve plate, the can may be connected with either the milking vacuum system or with air, or both may be turned off by moving a solid portion of the plate G over the single port of the plate G'.

For use in the bucket system of working, the can may be similarly connected to the main F which in this case is entirely a vacuum main, or it may be connected to such main through a pulsator apparatus H of any of the known bucket pulsator types commonly employed and positioned upon the can top, such pulsator then also carrying out the pulsations of the teat cups through the usual connection H'. When changing over from the releaser system to the bucket system using the pulsator H, it is only necessary therefore to disconnect the branch F' from the valve plate G and connect it with the pulsator and then to close the ports in the apparatus G—G'.

In order to facilitate the removal of the can from one bail to another in the milking shed, it may be carried on a rail J fixed to extend along within the shed by providing on its rear side a bracket K in which a runner pulley K' is journalled. This pulley runs on the rail J and holds the can in the proper position and at the required height. It may therefore be shifted from bail to bail as required to milk the several cows, the connection with the main F being broken and then re-made at the new milking point.

Fixed upon the front of the can is a spring weighing scale apparatus M of any known and approved form having the indicator dial N and the hook O upon which the matter or article to be weighed may be suspended. This apparatus is designed to suspend a bucket P beneath the outlet B' in the manner shown in the drawings, in order that the milk discharged from the can will be caught in the bucket and its weight then indicated by the dial N of the scale apparatus.

In the working of the appliance, the milk is received from the cow and collects in the can until the whole of the milk given is collected. A bucket is suspended on the scale and the milk released from the can by breaking the vacuum therein through the operation of the valve G—G', when the weight of the milk will force the flap valve C open and allow it to flow freely and quickly through into the bucket. The can may then be immediately connected up again in the system and with another cow to proceed with the milking thereof. Then the hand strippings of the first cow are taken from the cow and added to the bucket's contents so that the weight of the full quantity given is recorded by the dial N. This then being noted, a small quantity may be removed for testing by any approved means, as for instance a pipette.

The bucket may then be removed and the milk transferred to any desired receptacle. Should it be desired to send the milk from the bucket into the main F and thence to a releaser apparatus, a special flexible pipe connection R depending from a valve controlled branch R' of the main is employed. The lower end of this is placed in the bucket and the control valve opened, when the air pressure upon the milk will cause it to be carried up into the main and along it in the well known manner. The bottom end of this pipe is preferably formed with a suction bell mouth r adapted to make an airtight seal with the bottom of the bucket as the bucket rises on the scales as it is emptied and thereby to shut off the entry of air into the vacuum system.

I claim:—

1. Means for the purposes herein described consisting in the combination of an airtight can having means for its connection with the cow being milked, and having an outlet for the milk controlled by a normally closed gravity valve, of a valve upon such can constructed to connect the can with a source of vacuum or with the atmosphere, at will, and a means for suspending a receptacle beneath the said outlet, substantially as specified.

2. Means for the purposes herein described consisting in an airtight can, valve apparatus mounted on the top of such can constructed to connect the can with the vacuum main or with the atmosphere at will, a milk inlet leading into such can and adapted to be connected with the cow, a discharge outlet at the bottom of the can, a valve hinged upon the outside of the can and normally covering the said outlet, means for suspending a receptacle beneath the outlet, substantially as specified.

3. Means for the purposes herein described the combination with a main connected with a vacuum source, of an airtight can having means for its connection with the cow being milked, a pulsator apparatus mounted on such can, a connection between the said main and the pulsator apparatus and the can, a discharge opening in the bottom of the can having a hinged flap valve covering its outlet and means for suspending a receptacle beneath the said outlet, substantially as specified.

4. In a mechanical milking apparatus, a milk collecting device adapted to operate interchangeably as a releaser or bucket collector, said device comprising an airtight can, means for connection at will with a vacuum line or milk line and with the cow through a pulsator, a vacuum operated discharge valve and means for connecting the tank at will to the atmosphere, to the vacuum main or to close both connections.

In testimony whereof, I affix my signature.

ROBERT PRESTON.